J. KOENIG.
EXPANSION PIPE JOINT.
APPLICATION FILED MAR. 2, 1908.
995,792.
Patented June 20, 1911.
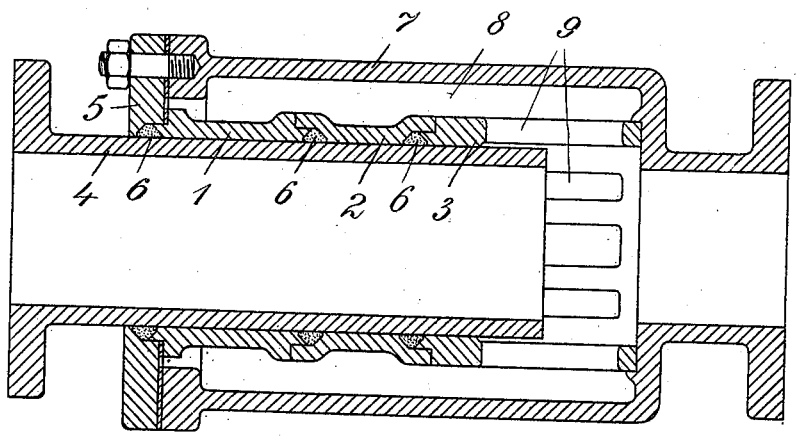
Witnesses:
P. F. Nagle.
L. Douville.
Inventor.
Johann Koenig.
By Wiedersheim & Fairbanks.
Attorneys.

UNITED STATES PATENT OFFICE.

JOHANN KOENIG, OF RIGA, RUSSIA.

EXPANSION PIPE-JOINT.

995,792.  Specification of Letters Patent.  Patented June 20, 1911.

Application filed March 2, 1908. Serial No. 418,816.

*To all whom it may concern:*

Be it known that I, JOHANN KOENIG, engineer, a subject of the King of Bavaria, residing at 97 Alexanderstrasse, Riga, Russia, have invented new and useful Improvements in Expansion Pipe-Joints, of which the following is a specification.

The subject of my invention is a stuffing-box device for connecting pipes, in which the expansion-joint is made by means of exactly fitting metal collars or sleeves and thin rings of asbestos or the like, which are forced into the sleeves with a definite amount of pressure, so as not to yield subsequently. For this purpose the stuffing-box is so constructed that it is surrounded both internally and externally by the medium which is being conducted through the pipes, such as hot steam, cold water, or the like.

The invention is illustrated on the drawing which shows the joint in longitudinal section.

In the expansion-joint shown in the drawing are three sleeves fitting the flanged spigot 4 as exactly and tightly as is possible without obstructing sliding on the application of moderate force, while preventing radial motion of the spigot. The grooves furnished between the several sleeves 1, 2, 3 and between the sleeve 1 and the cover 5 accommodate thin packing-rings 6 of asbestos, soft metal or the like. The sleeves 1, 2 and 3 interlock the one with the other. The rings 6 are forced in by a definite amount of pressure, previously exactly determined experimentally, in such manner that the spigot 4 can readily slide, though being thoroughly well packed.

Between the sleeves 1, 2, 3 and the socket of the flanged faucet 7 there is an annular chamber 8 which communicates with the piping through openings 9, so that the sleeves 1, 2, 3 are surrounded both internally and externally by the medium flowing through the piping. In this manner uniform expansion of the spigot 4 and of the accurately fitting sleeves is insured.

The asbestos rings 6, which, as already remarked, are forced into the grooves under a definite, experimentally determined, pressure, do not require to be tightened up for several years and remain in the pressed condition imparted to them on assemblage of the parts at the works, until finally they become worn, and consequently loose, through the friction of the spigot 4.

In order to promote uniform expansion of the various parts of the joint under the action of the medium flowing through the piping, it is advantageous to make all the parts of the same metal, for instance cast-iron or the like.

As shown in the drawing there are three asbestos rings 6, but naturally there might, for instance, be only one employed.

For the purpose of keeping the wear and tear of the asbestos rings as low as possible, the exterior wall of the spigot 4 may be ground.

Having thus described my invention what I claim as new and desire to secure by Letters Patent is:—

An expansion pipe joint comprising in combination, a faucet pipe, a spigot pipe telescoping therein, grooved and interlocking metal stuffing box sleeves fitted accurately to the spigot pipe, thin packing rings fitted between the grooves in the stuffing box sleeves, a grooved ring or flange secured to the end of the faucet pipe so as to bind the stuffing box sleeves together and secure the thin packing rings in the grooves therebetween, and an enlargement on the end of the faucet pipe forming an annular chamber communicating with the pipes and between the faucet pipe and the stuffing box sleeves and into which the steam or fluid passing through the pipes enters so that the exterior and interior of the stuffing box sleeves will be subjected to the same pressures and temperatures.

In witness whereof I have hereunto signed my name this 10th day of February 1908, in the presence of two subscribing witnesses.

JOHANN KOENIG.

Witnesses:
 WOLDEMAR HAUPT,
 HENRY HASPER.